W. A. TURBAYNE.
DYNAMO ELECTRIC MACHINE.
APPLICATION FILED MAR. 9, 1916. RENEWED MAY 9, 1921.

1,401,947.  Patented Dec. 27, 1921.

Witnesses
David H. Tinkler
Ralph Munden

Inventor
William A. Turbayne.
By Raymond H. Van Kest.
Attorney

UNITED STATES PATENT OFFICE.

WILLIAM A. TURBAYNE, OF NIAGARA FALLS, NEW YORK, ASSIGNOR TO U. S. LIGHT & HEAT CORPORATION, OF NIAGARA FALLS, NEW YORK, A CORPORATION OF NEW YORK.

DYNAMO-ELECTRIC MACHINE.

1,401,947.  Specification of Letters Patent.  Patented Dec. 27, 1921.

Application filed March 9, 1916, Serial No. 83,190. Renewed May 9, 1921. Serial No. 468,169.

*To all whom it may concern:*

Be it known that I, WILLIAM A. TURBAYNE, a citizen of the United States, residing at Niagara Falls, in the county of Niagara and State of New York, have invented new and useful Improvements in Dynamo-Electric Machines, of which the following is a specification.

This invention relates to improvements in dynamo-electric machines.

More particularly the invention relates to a dynamo-electric machine adapted for use as a starting motor and battery charging generator in an automobile starting and lighting system.

In such systems a single dynamo-electric machine performs both functions, acting first as a motor to start the engine, and thereafter as a generator to supply current. This is known as the single unit system as distinguished from the system in which separate machines perform the functions of motor and generator, known as the double unit system. In a single unit system the dynamo electric machine is mechanically connected by gears, or otherwise, to the engine crank shaft. A storage battery is connected across the terminals of the machine. The storage battery furnishes current to operate the machine as a motor to start the engine, and after the engine begins to operate under its own power, the dynamo-electric machine is operated by the engine as a generator to charge the storage battery and supply lamps or other translating devices on the automobile. The speed of the engine, and hence the speed of the generator, varies widely. It is desirable to maintain the output of the generator within predetermined limits, regardless of the generator speed, so as to prevent injury to the battery and to provide a proper charging current therefor. In practice it is often desired to hold the output substantially constant, notwithstanding speed variations. This result has generally been accomplished heretofore in practice by employing a regulator in the field circuit to vary the field resistance inversely as the speed. This regulator is mechanically or electro-magnetically operated.

In some recent systems the generator output has been maintained at the proper value without the use of an external regulator, the generator inherently delivering the proper current under varying speed conditions. The electrical conditions in a single unit system are peculiar and present many difficulties in obtaining proper inherent output control. The machine must be capable of exerting a very high torque for a short time when acting as a starting motor. When acting as a generator, however, the output must be held to a very low value, as the storage batteries employed are small and the current required for charging is correspondingly small. Obviously, these conditions demand dynamo-electric machines of widely different characteristics. To obtain the required starting torque, it is necessary to provide a low resistance armature of relatively few conductors, capable of carrying a very high current in starting. The magnetizing effect or armature reaction from such an armature is very small and cannot be relied upon in the ordinary manner to give any substantial degree of regulation to hold the relatively low output demanded when the machine operates as a generator.

The design of a single unit starting and lighting system wherein the unit is inherently regulated, presents many conflicting problems. For example, pronounced armature reaction, while essential for close inherent regulation when the unit operates as a generator, operates adversely under motoring conditions, for the reason that the great distortion of the effective flux destroys the desired quadrature relation between armature and field flux axes required for maximum torque condition.

According to the present invention, means are provided to augment the effect of the armature so that the effective field flux may be held within proper limits to cause the proper generator current.

An object of the present invention is to provide improved means whereby the generator will deliver a proper charging current for the battery, notwithstanding wide variations in generator speed.

A further object of the invention is to provide a generator having improved means for maintaining a substantially constant output when operating at widely varying speeds.

A further object is to provide a single unit starting and lighting system of the inherently regulated type in which the effects of armature cross flux are substantially nullified when the unit operates as a motor whereby said unit may exert maximum torque, and in which the effects of armature reaction are accentuated to produce close regulation when the unit acts as a generator.

Other objects will appear as the description proceeds.

Referring to the drawings—

Figure 1:
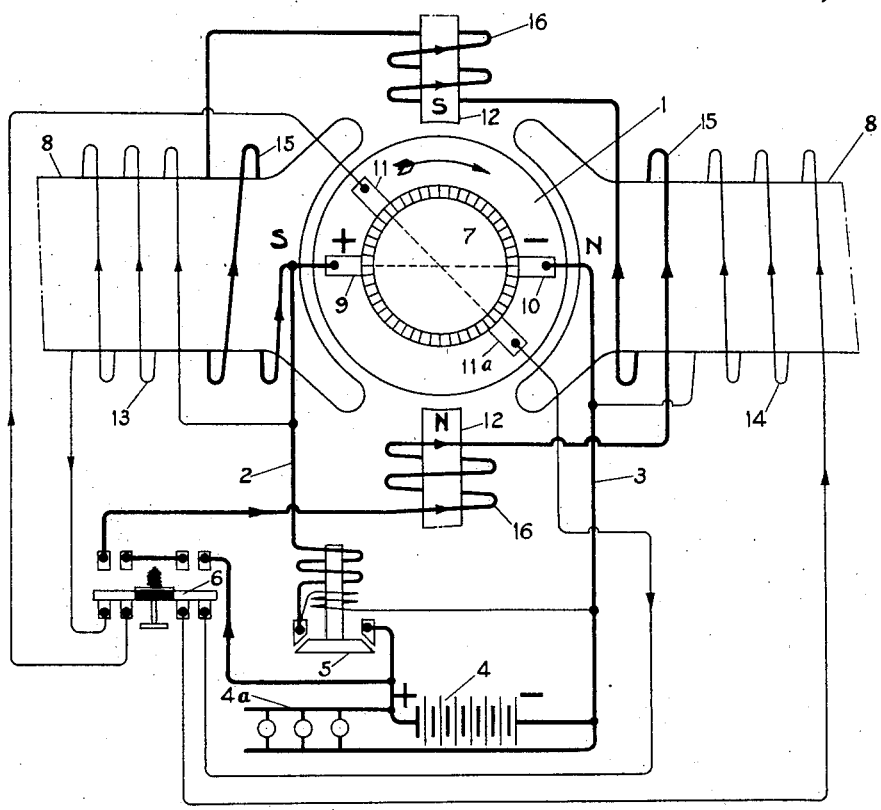
Figure 1 represents diagrammatically a system arranged according to the present invention.

The complete system as represented in Fig. 1 includes a dynamo-electric machine 1, having a main circuit 2, 3, supplying a storage battery 4, across which may be connected a lighting system 4ª. The dynamo-electric machine is herein referred to either as a motor or a generator, depending upon the phase of its operation under discussion.

An automatic switch 5 is connected in one of the main leads. This switch may be of any preferred construction. A starting switch 6 is also provided, the functions of which will be described hereinafter.

The generator 1 is illustrated for the sake of simplicity, as a bipolar machine. The present invention is adaptable, however, to a machine having any practical number of poles, the principle being the same, regardless of the number of poles. The dynamo-electric machine has a rotating armature 7 and stationary field poles 8. The armature may be either of the Gramme or drum type. In the embodiment of the invention herein chosen to illustrate the principles of the invention, the armature 7 is of the drum type. With an armature winding having symmetrical end connections, the main brushes 9 and 10 will be in line with the centers of the main field poles 8. A pair of auxiliary brushes 11 and 11ª are provided angularly advanced on the commutator with respect to the main brushes in the direction of rotation of the armature. A difference of potential will therefore exist between main brush 9 and auxiliary brush 11 and between auxiliary brush 11ª and main brush 10. This difference of potential existing between the main and auxiliary brushes will depend on the amount of advance of the auxiliary brushes.

Located between the main field poles 8 are auxiliary poles 12. The main field poles 8 are provided with shunt field windings 13 and 14, connected across brushes 9—11 and 11ª—10 respectively. Both shunt field windings are controlled by the starting switch 6, as illustrated in Fig. 1, being thrown in circuit when said starting switch 6 is in the running position, as when the dynamo electric machine is operating as a generator.

Located on the main field poles 8 and the auxiliary poles 12 are windings 15 and 16, respectively. These windings 15 and 16 are composed of comparatively heavy wire and are adapted to be thrown in circuit when the starting switch is moved to its upper or starting position. They are therefore operative when the dynamo-electric machine is operating as a motor. The windings 15 on the main field poles act as the series field windings. The windings 16 on the auxiliary poles are so designed that, together, they have approximately the same number of ampere conductors as the armature 7. Said windings 16 are so connected that when the dynamo-electric machine operates as a motor, the M. M. F. will substantially equal and oppose that of the armature conductors acting in line therewith. It will be understood that instead of locating the windings 16 on the pole pieces 12, said windings 16 may be located in slots in the pole pieces 8, 8, after the manner of the well known Ryan windings. The construction illustrated is, however, cheaper to manufacture.

Figure 2:
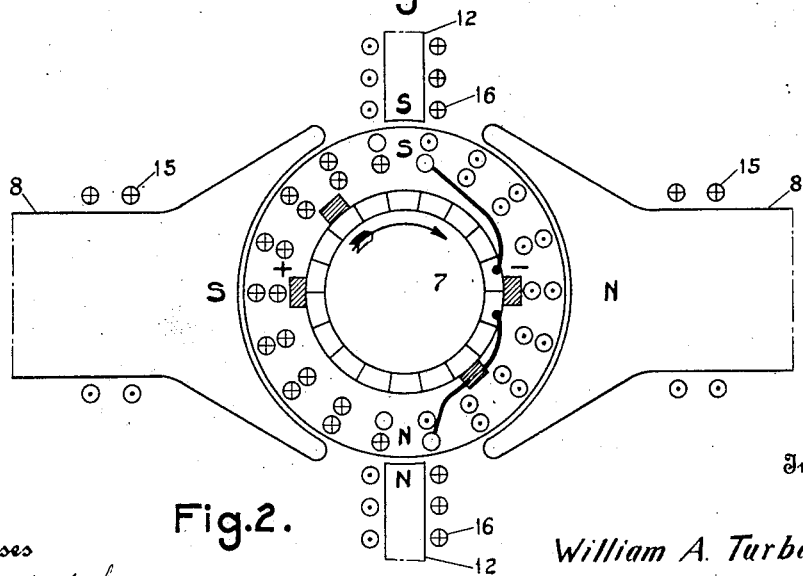
Fig. 2 represents diagrammatically a type of generator which may be used according to the present invention.

Fig. 2 indicates diagrammatically the relative directions of current flow in the various windings when the machine is operating as a motor. Two of the armature end connections are also illustrated to show the pitch used in the windings.

A mode of operation of the present invention is substantially as follows: When the starting switch is pressed upward, current from the battery will flow through the switch contacts, the series windings 15, compensating windings 16 and the armature 7. The shunt coils 13 and 14 under this condition are open-circuited. As explained above, the M. M. F. of the compensating winding 16 will substantially equal and oppose that of the armature conductors acting in line therewith, minimizing the distortion of the main field flux and permitting maximum torque. After the engine takes hold as a prime mover, however, and the starting switch 6 is released, shunt windings 13 and 14 will be closed across their appropriate brushes and charging current will now flow from the positive brush 9 through the automatic switch 5 and the battery 4, to the negative brush 10. The dynamo-electric machine will operate as an inherently regulated shunt generator in which the auxiliary poles 12 will operate as unwound poles to accentuate the distorting effects of the armature current and produce the desired close regulation to a low current value suitable for charging the storage battery.

I have described in detail one embodiment of the present invention. It will be obvious to those skilled in the art that many modifications may be made without departing from the scope of the invention as defined in the appended claims.

Having thus described my invention, what

I claim as new and desire to secure by Letters Patent of the United States is:

1. In a starting and lighting system, a dynamo-electric machine adapted to operate either as a motor or a generator, said dynamo-electric machine being provided with compensating field poles whereby said machine is regulated while operating as a generator, windings on said compensating poles, and means permitting the energization of said windings only when the machine is operating as a motor.

2. In a starting and lighting system, a dynamo-electric machine adapted to operate either as a generator or as a motor, said machine including field poles and an armature, and means for permitting the distortion of the field flux by the armature reaction for regulating purposes while the machine is operating as a generator and preventing said distortion while the machine is operating as a motor.

3. A dynamo-electric machine adapted to operate either as a generator or a motor and provided with main field poles and an armature, compensating poles included in said machine whereby the armature cross flux may distort the field flux to produce close regulation while the machine is acting as a generator, and windings on said compensating poles adapted to produce a flux in opposition to said cross flux while the machine is operating as a motor.

4. In a system, a storage battery, an inherently regulated dynamo-electric machine adapted to operate both as a generator and a motor, said machine being provided with means adapted to aid or to oppose the cross flux due to the armature reaction, and a switch for controlling the action of said means, said means being responsive to current flow between said battery and said machine.

5. In a combined starting and lighting system, a dynamo-electric machine adapted to operate both as a generator and a motor, said machine being provided with compensating field poles, field windings adapted to be connected in circuit only when said machine is operating as a generator, other field windings adapted to be connected in circuit when said machine is operating as a motor, and compensating field windings located on said compensating poles and in series with said second mentioned field windings, said compensating windings being wound to oppose the armature cross flux and switching means for rendering said compensation winding ineffective during generating functions.

6. In a combined starting and lighting system, a dynamo-electric machine, a battery and a starting switch, said machine being provided with an armature, main field poles, compensating poles, main brushes and auxiliary brushes, windings on said main poles, each connected between a main brush and an auxiliary brush, said windings being controlled by said starting switch to be connected in circuit when said switch is in running position, other field windings located on said main poles, and compensating windings located on said compensating poles controlled by said switch to be connected in series with said battery and armature when said switch is in starting position.

7. In combination, a dynamo-electric machine adapted to operate either as a generator or a motor, said machine being provided with main field poles and compensating poles, all provided with windings, and a starting switch controlling said windings to connect the windings of said compensating poles in circuit when in starting position and to disconnect same when in running position.

8. A dynamo provided with an armature and inherently regulating means coöperating with said armature, said means having windings associated therewith, and a switch whereby said windings may oppose an effect of said armature during the motoring functions only.

9. A dynamo provided with compensating poles and main poles, generator windings, motor windings and compensating windings on said poles, and a switch which by one movement throws the generator windings into circuit and the other windings out of circuit and by the reverse movement throws the generator windings out of circuit and the other windings into circuit.

10. In combination, a dynamo-electric machine having both motoring and generating functions, said machine having field poles, an armature and electro-magnetic means for controlling the armature cross flux, and switch means for controlling said electro-magnetic means to set up an opposing E. M. F. to the armature cross flux during motoring functions only.

11. In combination, a dynamo electric machine, switch means occupying different positions while said machine is performing motoring and generating functions, and electro-magnetic means for controlling the armature cross flux of said machine, said switch means controlling said electro-magnetic means to cause said electro-magnetic means to oppose armature cross flux during motoring functions only.

12. In combination, a dynamo-electric machine adapted to operate either as a motor or a generator, said machine being provided with field poles and an armature, means for controlling the effects of armature reaction, and a starting switch for said machine adapted to control said means to cause said means to oppose armature cross flux during motoring functions only.

13. An inherently regulated generator provided with main poles and regulating poles, said regulating poles being provided with windings adapted to be connected in circuit when said generator is operated as a motor, and means for nullifying said windings during the performance of generating functions, said generator being provided with a single armature winding.

In witness whereof I have hereunto subscribed my name.

WILLIAM A. TURBAYNE.